May 25, 1965     E. L. CHADWICK     3,185,493
QUICK-CHANGE CHUCK
Filed March 14, 1962     3 Sheets-Sheet 1
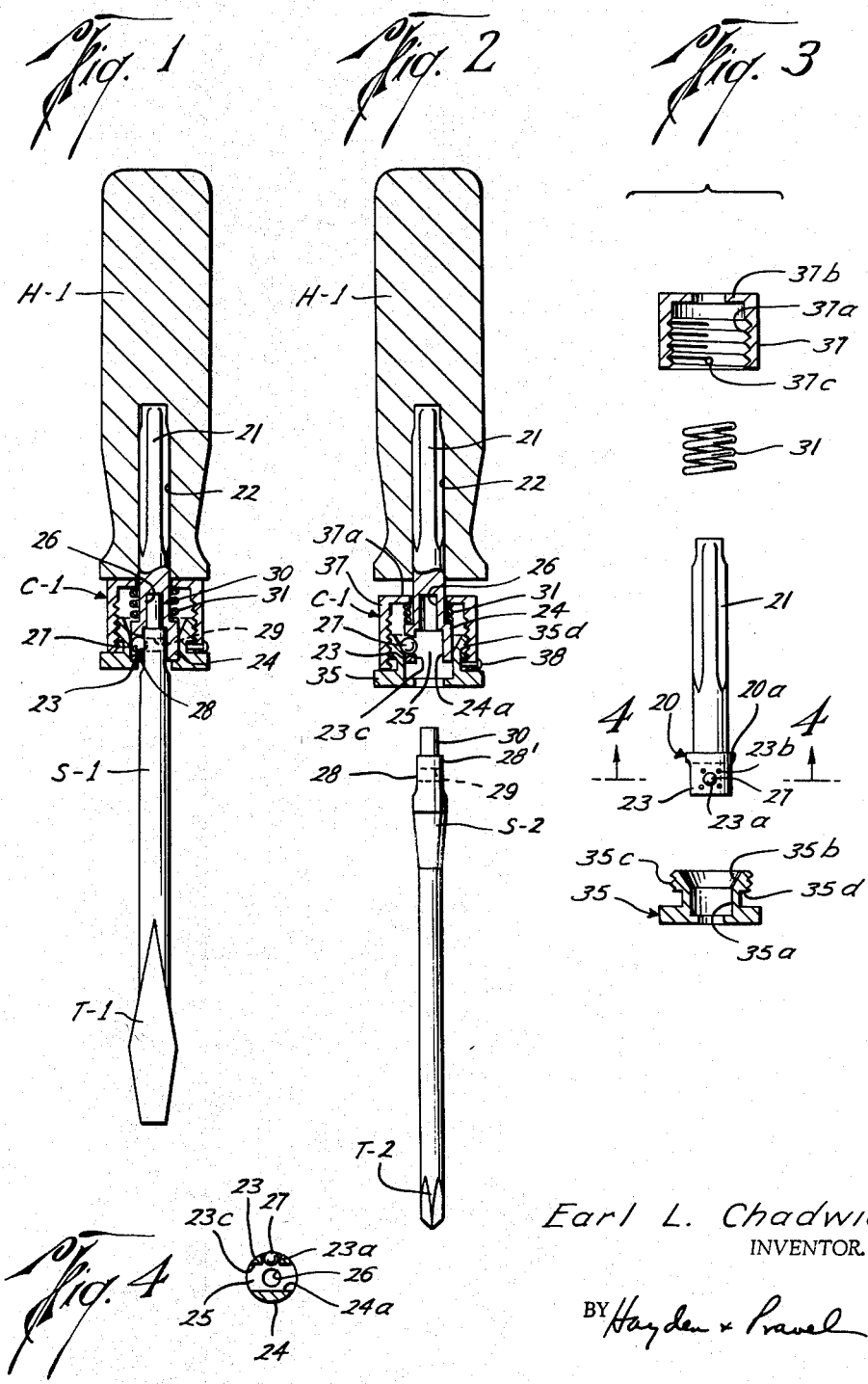
Earl L. Chadwick
INVENTOR.
BY Hayden & Pravel
ATTORNEYS May 25, 1965  E. L. CHADWICK  3,185,493
QUICK-CHANGE CHUCK Filed March 14, 1962  3 Sheets-Sheet 2

Earl L. Chadwick
INVENTOR.

BY Hayden + Prawel

ATTORNEYS

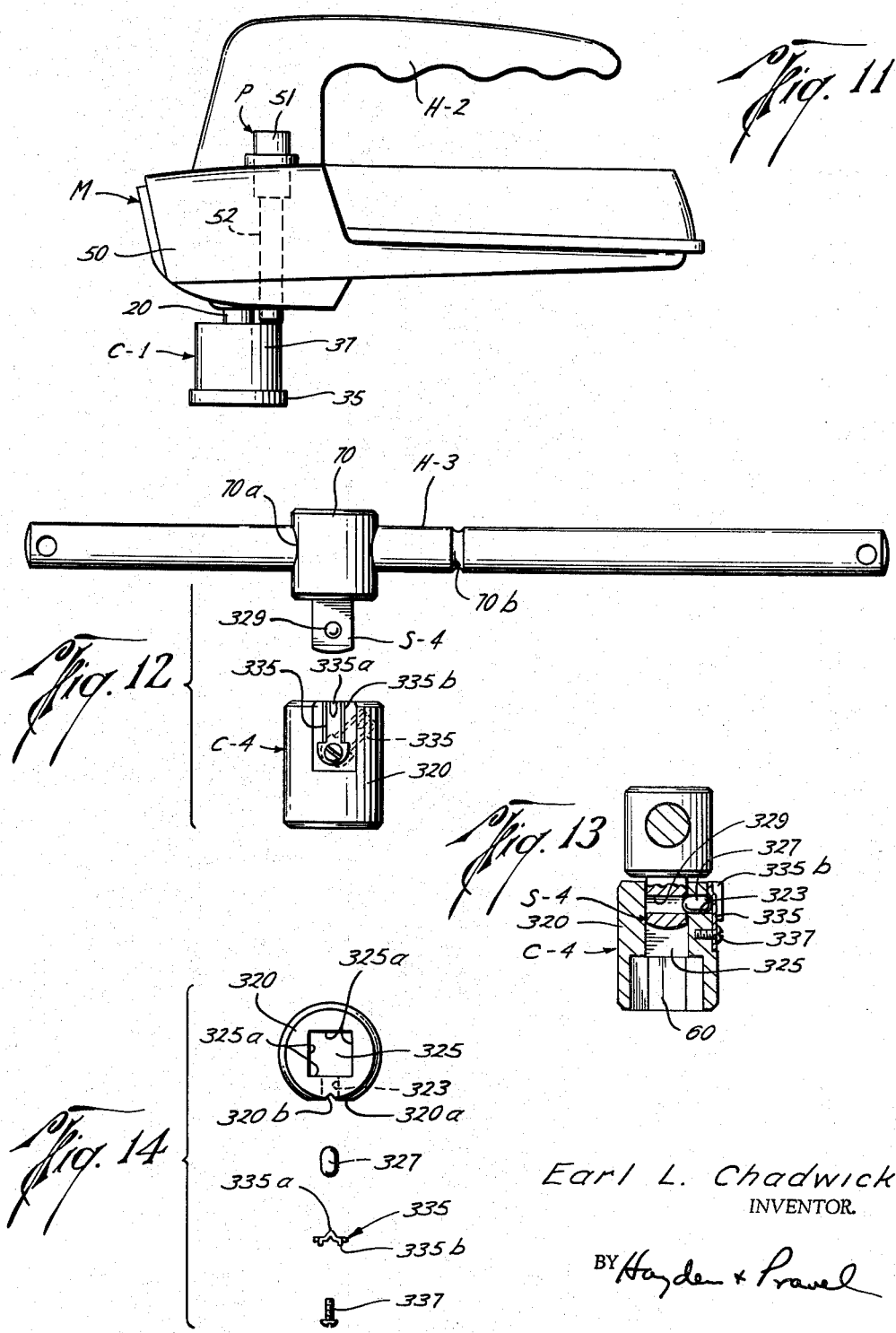

3,185,493
QUICK-CHANGE CHUCK
Earl L. Chadwick, P.O. Box 4100, Portland 8, Oreg.
Filed Mar. 14, 1962, Ser. No. 179,597
9 Claims. (Cl. 279—82)

This invention relates to new and useful improvements in chucks, and particularly tool chucks which are adapted to quickly receive and release tools therefrom.

An object of this invention is to provide a new and improved chuck for both manually and power operated tools and equipment which is adapted to quickly and easily receive and lock such tools and equipment therein for use and which is also adapted to permit a quick release and change of such tools and equipment.

An important object of this invention is to provide a new and improved chuck which has means to prevent rotation and longitudinal movement of the shank end of the tool with respect to the chuck whereby a positive locking of the tool in the chuck is obtained.

Another object of this invention is to provide a new and improved chuck which is particularly adapted for use with socket wrenches, screwdriver shanks, and other tools, and wherein such chuck is adapted to lock such tools therein upon rotation in one form of the invention and by longitudinal movement in another form of the invention.

A further object of this invention is to provide a new and improved chuck which is adapted to release the shank end of a tool from the chuck by a movement of a release element of the chuck in a direction away from the handle on which the chuck is mounted so that the tendency to inadvertently release the tool from the chuck during use is avoided.

A particular object of this invention is to provide a new and improved chuck having a pivotable locking lever therewith which is adapted to be pivoted for locking and releasing tools in said chuck.

Still another object of this invention is to provide a new and improved chuck which is suitable for a mixing device and which has a push button release means in proximity to the handle of the mixing device to facilitate the release of the mixing device beaters or the like.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is a view, partly in elevation and partly in section, illustrating one form of the present invention, with a screwdriver tool inserted in a locked position;

FIG. 2 is a view similar to FIG. 1, but illustrating the chuck of this invention in the released position, with another type of screwdriver tool disengaged therefrom;

FIG. 3 is an exploded view, partly in elevation and partly in section, illustrating the components of the chuck of this invention;

FIG. 4 is a cross-sectional view taken on line 4—4 of FIG. 3;

FIG. 11 is an elevation of a mixing device having a push button release mechanism adjacent to the handle of such mixing device for rapid and easy release of the beaters or the like from the device;

FIG. 12 is an elevation, partially exploded, to illustrate a further modification of the chuck of this invention in combination with a tool handle;

FIG. 13 is a vertical sectional view of the embodiment of FIG. 12, illustrating the chuck connected to the shank of the tool handle; and FIG. 14 is an exploded view of the chuck illustrated in FIGS. 12 and 13.

Figure 5:
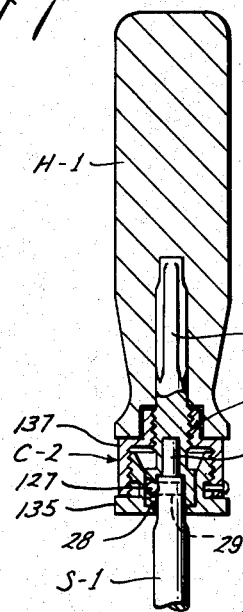
FIG. 5 is a view, partly in elevation and partly in section, illustrating another form of the chuck of this invention in the locked position.

In the drawings, the designation C–1 indicates generally the first form of the chuck of this invention (FIGS. 1–4). The chuck C–1 is connected with a handle H–1 of any suitable construction. Also, the chuck C–1 is adapted to be releasably connected to a shank S–1 having any suitable type of tool T–1 or the like therewith. As will be more fully explained, the chuck C–1 in the form shown in FIGS. 1–3 is adapted to move longitudinally without rotation for releasing and locking the shank S–1. When the chuck C–1 is in the raised position of FIG. 1, the shank S–1 is locked in the chuck C–1 against both longitudinal and rotational movement so that in use, upon a rotation or other movement of the handle H–1, such rotation and other movement is transmitted to the shank S–1 and the tool T–1 therewith. The shank S–1 is released by moving the chuck C–1 downwardly without rotation to the position shown in FIG. 2, which is the released position permitting the release of the shank S–1 and the tool T–1 therefrom for replacement with another shank S–2 having a tool T–2 therewith. The connection, release and change of the tools using the chuck C–1 is accomplished rapidly and with simply a longitudinal motion, as will be more fully explained. Other forms of the chuck of this invention are locked and released by different types of action, as will also be more fully explained.

Considering now the form of the invention illustrated in FIGS. 1–4, the chuck C–1 includes a shank receiving member or body 20, which as illustrated, has an upper longitudinally grooved stem 21 which fits securely within a suitable opening 22 in handle H–1. The shank-receiving member 20 includes a pair of downwardly extending legs or projections 23 and 24 which are separated by an opening or space 25. A pilot hole 26 is formed in the stem 21 immediately above the hole or space 25. The leg 23 is formed with a tapered opening 23a which is adapted to receive a locking element 27, which in the form shown in FIGS. 1–4 is a ball. The opening 23a is tapered to a smaller diameter on its inner surface as best seen in FIG. 4 to prevent the ball 27 from moving inwardly more than necessary to serve as a lock for the shank S–1. In the normal case, the size of the hole 23a on its inner diameter is just slightly less than the diameter of the ball 27 so that the ball 27 actually extends into the space 25, but cannot fall inwardly into such space or hole 25. The ball 27 is prevented from falling outwardly from the hole 23a by punch marks or depressions 23b (FIG. 3) spaced at various points around the external surface of the leg 23. The inner surface 23c is preferably flat for engaging a corresponding flat surface on the shank S–1 which is indicated at 28 (FIG. 1). It is to be noted that the shank S–1 has a cavity, which takes the form of a hole 29 in FIG. 1, although it may be merely a recess or depression instead. In any event, the ball 27 is adapted to expand into the cavity 29 when the shank S-1 is inserted into the hole 25 in the locked position.

The shank S-1 also has a pilot 30 which extends into the pilot opening or hole 26 and serves to guide the shank S-1 into its proper seated position for locking with the ball or other locking element 27. An external shoulder 20a is formed on the shank-receiving member 20 for engagement by a resilient member or spring 31, the purpose of which will be explained hereinafter.

The chuck C-1 includes a sleeve 35 which has an inner longitudinal surface 35a which is adapted to engage the ball or locking element 27 and hold same in the locked position extending into the space 25. The sleeve 35 also has a tapered or inclined surface 35b which is tapered upwardly and outwardly from the longitudinal inner surface 35a. Such surface 35b acts as a cam to return the ball 27 from a released position to the locked position. Also, when the surface 35b is opposite the ball 27, the ball 27 may move outwardly to the released position for releasing the shank S-1 from the chuck C-1. The locking and release sleeve 35 is formed with threads 35c which are adapted to engage in threaded contact with a retaining member or cylinder 37. The member 37 has internal threads 37a which are in threaded engagement with the threads 35c of the sleeve 35 when the chuck C-1 is assembled. The assembled position of the cylinder 37 and the sleeve 35 is illustrated in FIGS. 1 and 2. In order to hold the cylinder 37 and the sleeve 35 in the assembled position, a set screw or pin 38 is preferably employed and it extends below a shoulder 35d on the sleeve 35. Thus, the cylinder 37 and the sleeve 35 are actually fixed relative to each other during normal usage, and it will be understood that such parts may be press fitted together or otherwise secured rather than by threads.

The spring 31 is confined between the upper flange 37b of the cylinder 37 and the shoulder 20a on the body 20. In moving the chuck C-1 from the locked position of FIG. 1 to the released position of FIG. 2, the cylinder 37 and the sleeve 35 are moved downwardly together which causes a compression of the spring 31 and permits a retraction or outward movement of the locking element 27 so that a release of the shank S-1 or S-2 is accomplished. The spring 31 returns the cylinder 37 and therefore the locking sleeve 35 upwardly to the position shown in FIG. 1. Thus, by a straight non-rotative longitudinal movement, the chuck C-1 is adapted to lock and release a shank inserted into the hole 25.

Various types of shanks may be employed, two of which are illustrated in FIGS. 1 and 2, and others of which will be described hereinafter. The shank S-2 is substantially the same as the shank S-1 in that it has a pilot 30 and at least one flat side 28 which is adapted to engage the flat side 23c. Also, a hole 29 or a similar cavity is provided in the shank S-2 for receiving a portion of the ball 27 when in the locked or locking position. It should be pointed out that in both the shank S-1 and the shank S-2, more than one flat surface 28 may be employed, and as indicated in FIG. 2, the shank S-2 has an additional flat surface 28' which would engage with the inner surface 24a which may be flat if the surface 28' is so constructed. Also, it should be pointed out that the shank-receiving member 20 may be formed with a square hole 25 having flat internal surfaces on four or more sides and with corresponding flat surfaces 28 on the shank S-1 or shank S-2.

Figure 6:
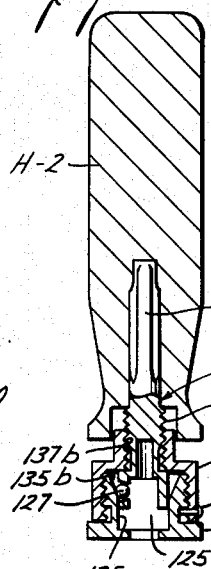
FIG. 6 is a view similar to FIG. 5, but illustrating the chuck in the released position.
Figure 7:
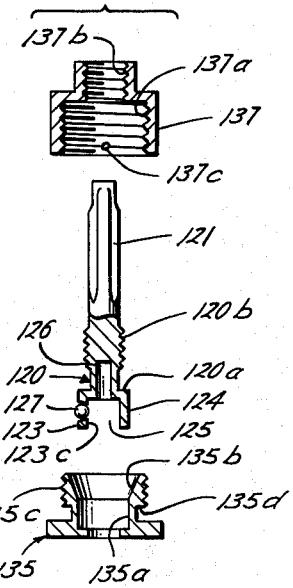
FIG. 7 is an exploded view of the form of the invention illustrated in FIGS. 5 and 6.

In FIGS. 5-7, a modified chuck C-2 is illustrated, wherein the locking and release of a shank such as the shank S-1 is accomplished by rotation. The shank-receiving member or body 120 of the chuck C-2 (FIG. 7) is identical with the shank-receiving member 20 of FIG. 3, except that the member 120 has external threads 120b formed thereon above the shoulder 120a. The parts of the member 120 which are identical with the parts of the member 20 bear the same numerals and letters, except that the parts of the member 120 are preceded by the numeral one.

The sleeve 135 of the chuck C-2 is preferably identical in all respects with the sleeve 35 of FIG. 3 and therefore has the same numerals except that the numeral one precedes all of the numeral designations in FIG. 7.

The chuck C-2 has a modified cylinder 137 as compared to the cylinder 37 of FIG. 3 in that internal reduced diameter threads 137b are provided for threaded engagement with the external threads 120b. The cylinder 137 and the sleeve 135 are locked together by a retaining pin 138 extending through the opening 137c in the same manner as described in connection with the pin 38 in FIG. 2, or the cylinder 137 and sleeve 135 may be press fitted or otherwise secured. Relative rotation is effected between the cylinder 137 and the body 120 by the coaction of the threads 137b and 120b.

When the sleeve 135 is rotated to the locking position of FIG. 5, the locking element or ball 127 is urged and held outwardly in the same manner as heretofore described in connection with the ball 27 of FIGS. 1-4. Thus, the locking element 127 extends into the cavity 29 in the shank S-1 so as to hold the shank S-1 in the chuck C-2. Upon a rotation of the cylinder 137, the cylinder 137 and the sleeve 135 both are rotated downwardly with respect to the member or body 120 to cause the inner longitudinal surface 135a to move below the ball or locking element 127 and to position the tapered or inclined surface 135b opposite such ball 127. Therefore, the ball 127 is free to move outwardly to the released position so that it does not extend into the space or opening 125. The ball 127 thus is free from the hole or cavity 29 of the shaft or shank S-1 and the tool with the shank S-1 can therefore be quickly and readily removed. When the shank S-1 is in the locked position, the flat surface 28 of the shank S-1 is in engagement with the inner flat surface 123c to prevent relative rotation between the body or member 120 and the shank S-1. It is thus believed evident that the form of the invention shown in FIGS. 5-7 is basically the same as that illustrated in FIGS. 1-3, except for the operation during the release and locking. Thus, in the form of FIGS. 5-7, the release and locking of the shank S-1 or any other suitable shank is effected by a rotation of the cylinder 137 and the sleeve 135 therewith, whereas, as explained in connection with FIGS. 1-3, the chuck C-1 is released and locked without any rotation and with a straight longitudinal movement.

Figure 8:
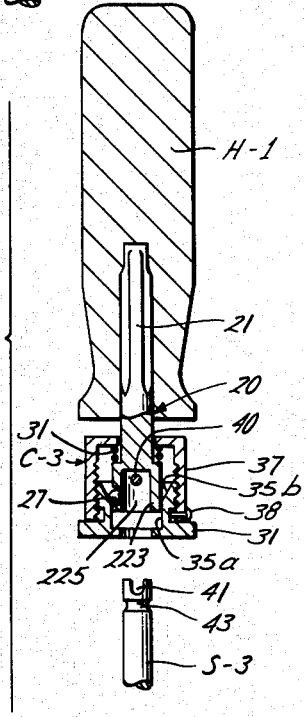
FIG. 8 is a view, partly in elevation and partly in section illustrating another modification of the chuck of this invention, such chuck being shown in its released position with a modified shank construction shown released therefrom.
Figure 9:
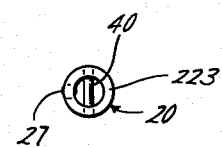
FIG. 9 is a view of the lower end of the shank-receiving member or body illustrated in FIG. 8.
Figure 10:
FIG. 10 is a plan view of the shank construction illustrated in FIG. 8.

In the form of the invention illustrated in FIG. 8, the same basic construction as that shown in FIGS. 1-4 is illustrated and like parts bear the same designation in FIGS. 1-3 and 8. The form of the invention shown in FIG. 8 differs from FIG. 1 in that the means for preventing relative rotation of the member 20 and the shank S-3 are different. Likewise, the shank construction S-3 is different from that disclosed in FIGS. 1 and 2. In FIG. 8, the opening 225 is in the form of a cylinder which is formed by a cylindrical wall 223 instead of the pair of legs 23 and 24 of FIGS. 1-3. Near the upper end of the hole 225, above the ball 27, a laterally extending rotation-locking pin or rod 40 is provided. Such rod 40 is adapted to enter a laterally extending notch or groove 41 in the upper end of the shank S-3 (FIG. 8). Thus, when the pin or rod 40 is in the notch or groove 41, the shank S-3 cannot rotate relative to the body or member 20.

The shank S-3 has a further modification as compared to the shanks S-1 and S-2, in that the shank S-3 has its cavity formed in the shape of an annular groove or ring 43 which is adapted to receive the ball 27 when the ball 27 is extended inwardly into the hole or opening 225. Thus, with the ball or other locking element 27 in the groove 43 and with the pin or rod 40 in the lateral groove 41, the shank S-3 is held against rotation relative to the body or member 20 and also is held against release from such body or element 20 in a longitudinal direction.

The locking and release of the shaft or shank S-3 from the chuck C-3 is accomplished by a straight non-rotative longitudinal movement in the same manner as described previously for FIGS. 1-3. The spring 31 is compressed upon a downward movement of the cylinder 37 so as to enable the sleeve 31 to move to a position in which the ball 27 is opposite the inclined inner surface 35b. In such position, the ball 27 no longer locks the shank S-3 and such shank may be removed for change or replacement. The spring 31 automatically acts to return the sleeve 37 and the sleeve 31 upwardly so as to position the inner longitudinal surface 35a opposite the ball 27 in the locking position. If the shaft S-3 has been reinserted into the hole 225, the shaft S-3 is then locked in its use position.

In FIG. 11, a mixing device M is generally illustrated and it may be of any conventional construction, with the exception of the chuck C-1 and the push-button mechanism P which is for operating the chuck C-1. The handle H-2 on the mixing device M is a standard handle and the push-button mechanism P is adjacent thereto so that the user of the mixing device may retain a grip on the handle H-2 while pushing down on the release button P. The chuck C-1 is identical with that disclosed in FIGS. 1 and 2, except that the member 20 is preferably modified so that it may be welded or otherwise affixed internally of the housing 50 of the mixing device M, which will be appreciated by those skilled in the art. The push-button mechanism P includes the push-button 51 which is slidably mounted in the housing 50 and which has a rod 52 connected therewith and extending downwardly to the top surface of the outer cylinder 37. Thus, by pushing downwardly on the push-button 51, the rod 52 transmits a downward movement to the cylinder 37 and the sleeve 35 to compress the spring (FIG. 2) so that the locking element or ball 27 is in the release position of FIG. 2. The mixing device M will normally have beaters of conventional construction which will have a shank such as illustrated in FIGS. 1, 2 or 8, or any other suitable shank which will be held against rotation and longitudinal movement when the chuck C-1 is in the raised position corresponding to that shown in FIG. 1.

Thus, with the form of the invention shown in FIG. 11, an automatic push-button release is effected on the mixing device M using the chuck C-1. It will be understood that the chuck C-1 may be replaced by the form of the chuck C-3 shown in FIG. 8 if the modified shank construction S-3 is employed for the beaters. Also, it will be understood that other types of tools besides beaters may be employed with such a mixing device M. In FIG. 12, the chuck C-4 includes a body or shank-receiving member 320 which has a shank-receiving opening 325. Preferably, the shank-receiving opening 325 has internal flat surfaces 325a, the number of which may vary. As shown, there are four flat surfaces 325a to form a square hole 325 which is adapted to receive the square shank S-4.

Below the hole 325, a nut opening 60 is provided for serving as a wrench to engage the flat surfaces on any conventional nut. The particular configuration and the number of flat surfaces in the nut opening or wrench 60 may of course be varied for particular styles of nuts.

A locking element 327 is mounted in a suitable opening 323 in the body or member 320. In the form illustrated in FIG. 13 and FIG. 14, the locking element 327 is an elongate pin having a ball shaped inner end, and preferably also a ball shaped outer end. The particular configuration of such locking element may of course vary depending upon the thickness of the body 320.

The external surface of the body 320 is formed with a flat segmental section 320a extending substantially perpendicular to the lateral opening 323. A locking lever or plate 335 is mounted on the flat segmental portion 320a by means of a pivot screw 337 or any other suitable securing means which permits pivotal movement of the locking lever 335. When the locking lever 335 is in the solid line position of FIG. 12 and FIG. 13, the locking element 327 is held in a locking position so that it projects into the opening 325 and therefore into a cavity 329 in the shank S-4. It should be noted that the locking element 327 may be limited in its lateral movement so that it cannot move into the opening 325 beyond the point illustrated in FIG. 13 and cannot fall out of the opening 323 in an outwardly direction. Such retention of the element 327 may be accomplished by punch marks or stakes in the usual known manner similar to that illustrated in FIG. 3. In any event, the element 327 is adapted to move laterally from the position shown in FIG. 13 to an outward position wherein the element 327 is out of the opening 325. The locking element 327 cannot move outwardly from the position shown in FIG. 13 so long as the locking lever 335 is in the position shown in FIG. 13 and in the solid line position of FIG. 12. However, upon a pivoting of the lever 335 to the dotted line position of FIG. 12, the locking element 327 can then move outwardly to a released position, permitting the release and withdrawal of the shank S-4 from the opening 325 by a retraction or outward movement of the pin or element 327.

In order to center and hold the locking lever 335 in the locked position, it is preferable to have a V-shaped notch 320b formed in the body 320 on about the center line of the lateral opening 323. Such notch 320b is adapted to receive a corresponding projection 335a on the locking lever 335 so that the locking lever 335 must spring back somewhat in order to move from its locked position shown in solid lines in FIG. 12. Thumb or finger tabs 335b for facilitating the pulling outwardly of the lever 335 are preferably provided on the lever 335.

In the form of the invention shown in FIG. 12, the shank S-4 is connected to a tool handle H-3 rather than a tool since the body 320 actually has the wrench 60 therewith. Thus, the handle H-3 is a sliding rod which fits through a head 70 of conventional construction having an opening 70a therethrough. A centering notch 70b is provided on the handle H-3 for accurately positioning the handle H-3 in the center of the head 70 in use. It will be understood that other types of handles or handle tools may be employed with the shank S-4. Also, instead of using the particular chuck C-4 in conjunction with a wrench 60, the body 320 may be inverted and connected to a handle so that the shank S-4 may be connected to a screwdriver or other tool. Further, the hole 329 illustrated in FIGS. 12 and 13 may be modified to provide only a recess or depression, as explained in connection with the form of the device shown in FIGS. 1 and 2. An annular groove such as shown in FIG. 8 may likewise be used in place of the opening 329. More than one opening or cavity 329 may be employed and additional locking elements 327 to correspond with such openings or cavities may be also provided.

The foregoing disclosure and description of the invention is illustrative and explanatory thereof and various changes in the size, shape and materials, as well as in the details of the illustrated construction, may be made without departing from the spirit of the invention.

What is claimed is:
1. A new and improved chuck for tools, comprising
   (a) a tool shank-receiving means for receiving a shank of a tool or the like,
   (b) said shank-receiving means having means therewith for preventing relative rotation between said means and the tool shank received thereby,
   (c) lock means for locking the tool shank to said shank-receiving means for preventing relative longitudinal movement therebetween,
   (d) release means for releasing said lock means for longitudinally moving the tool shank relative to said tool shank-receiving means to thereby release the tool from the chuck,

(e) a handle means connected to the upper end of said tool shank-receiving means, (f) a cylinder having a releasable connection with said release means and positioned in contact with said handle means, and (g) means associated with said release means and said cylinder for releasing said release means in a direction away from said handle means while said handle means remains connected to said tool shank-receiving means.

2. A new and improved chuck for tools, comprising (a) a tool shank-receiving body having a hole therein into which a shank of a tool or the like may be inserted, (b) said body having at least one surface adapted to be engaged by a corresponding surface on the tool shank to prevent rotation of the shank relative to said body, (c) releasable lock means mounted in said body for releasably locking the tool shank to said body to prevent longitudinal movement of the shank relative to said body until released therefrom, (d) release means for releasing said lock means so that the tool shank may be longitudinally moved out of said hole in said body and thereby be released from said body, (e) a handle means connected to the upper end of said tool shank-receiving body, (f) a cylinder having a releasable connection with said release means and positioned in contact with said handle means, and (g) means associated with said release means and said cylinder for releasing said release means in a direction away from said handle means while said handle means remains connected to said tool shank-receiving means.

3. A new and improved chuck for tools, comprising (a) a tool shank-receiving body having a hole therein into which a shank of a tool or the like may be inserted, (b) said body having at least one surface adapted to be engaged by a corresponding surface on the tool shank to prevent rotation of the shank relative to said body, (c) a locking element mounted in said body for lateral movement into and out of said hole, (d) a locking sleeve having a surface engaging said locking element for holding said locking element in a position extending into said hole, (e) an element for moving said locking sleeve relative to said locking element to move said surface to a different position with respect to said locking element so that said locking element is movable laterally in a direction out of said hole, whereby a release of the tool shank in the hole is effected, (f) a handle means connected to the upper end of said tool shank-receiving means, (g) a cylinder having a releasable connection with said locking sleeve and positioned in contact with said handle means, and (h) means on said locking sleeve and said cylinder for releasing said locking sleeve in a direction away from said handle means while said handle means remains connected to said tool shank-receiving body.

4. A new and improved chuck for tools, comprising (a) a tool shank-receiving body having a hole therein into which a shank of a tool or the like may be inserted, (b) said body having at least one surface adapted to be engaged by a corresponding surface on the tool shank to prevent rotation of the shank relative to said body, (c) a locking element mounted in said body for lateral movement into and out of said hole, (d) a locking sleeve having a longitudinal inner surface adapted to engage said locking element for holding it in locking position and also having a tapered inner surface for permitting said locking element to move laterally outwardly from the locking position to a released position, (e) an element for moving said locking sleeve relative to said locking element to move said longitudinal inner surface and said tapered inner surface relative to said locking element for moving same to and from the locking and released positions, (f) a handle means connected to the upper end of said tool shank-receiving means, (g) a cylinder having a releasable connection with said locking sleeve and positioned in contact with said handle means, and (h) means on said locking sleeve and said cylinder for releasing said locking sleeve in a direction away from said handle means while said handle means remains connected to said tool shank-receiving body.

5. A new and improved chuck for tools, comprising (a) a tool shank-receiving body having a hole therein into which a shank of a tool or the like may be inserted, (b) said body having at least one surface adapted to be engaged by a corresponding surface on the tool shank to prevent rotation of the shank relative to said body, (c) a locking element mounted in said body for lateral movement into and out of said hole, (d) a locking sleeve having a longitudinal inner surface adapted to engage said locking element for holding it in locking position and also having a tapered inner surface for permitting said locking element to move laterally outwardly from the locking position to a released position, (e) resilient means urging said sleeve longitudinally relative to said body for normally holding said locking element in the locking position, (f) an element associated with said locking sleeve for compressing said resilient means to enable said sleeve to be moved longitudinally to said released position, (g) a handle means connected to the upper end of said tool shank-receiving means, (h) means on said locking sleeve and said element for releasing said locking sleeve in a direction away from said handle means while said handle means remains connected to said tool shank-receiving body.

6. In combination with a shank of a tool or the like having at least one cavity, a chuck comprising (a) a shank-receiving member having a hole into which the shank is adapted to be inserted, (b) a lock element mounted in said member for lateral movement into and out of said cavity in said shank when said shank is inserted in said hole, and (c) means for releasably retaining said lock element in said cavity for locking said shank thereto and for releasing same, (d) a handle means connected to the upper end of said member, (e) a cylinder having a releasable connection with said release means and positioned in contact with said handle means, and (f) means associated with said release means and said cylinder for releasing said locking sleeve in a direction away from said handle means while said handle means remains connected to said shank-receiving member.

7. The structure set forth in claim 6, wherein said cavity is an annular groove in said shank.

8. In combination with a shank of a tool or the like having at least one external surface and at least one cavity, a chuck comprising (a) a shank-receiving member having a hole into which the shank is adapted to extend and an internal surface adapted to engage said external surface on said shank when said shank is so inserted to thereby prevent relative rotation therebetween, (b) a lock element mounted in said member for lateral movement into and out of said cavity in said shank when said shank is inserted in said hole, and (c) release means for releasably retaining said lock element in said cavity for locking said shank thereto and for releasing same, (d) a handle means connected to the upper end of said member, (e) a cylinder having a releasable connection with said release means and positioned in contact with said handle means, and (f) means associated with said release means and said cylinder for releasing said locking sleeve in a direction away from said handle means while said handle means remains connected to said shank-receiving member.

9. In combination with a shank of a tool or the like having a notched upper end and at least one cavity, a chuck comprising (a) a shank-receiving member having a hole into which the shank is adapted to be inserted, (b) a rotation-locking pin extending laterally in said hole and adapted to pass into said notched upper end of said shank to prevent rotation of said shank, (c) a lock element mounted in said member for lateral movement into and out of said cavity in said shank when said shank is inserted in said hole, (d) release means for releasably retaining said lock element in said cavity for locking said shank thereto and for releasing same, (e) a handle means connected to the upper end of said member, (f) a cylinder having a releasable connection with said release means and positioned in contact with said handle means, and (g) means associated with said release means and said cylinder for releasing said locking sleeve in a direction away from said handle means while said handle means remains connected to said shank-receiving member.

References Cited by the Examiner
UNITED STATES PATENTS

| | | | |
|---|---|---|---|
| 1,330,111 | 2/20 | Fegley | 279—81 |
| 2,736,562 | 2/56 | Blackburn | 279—76 |
| 2,807,473 | 9/57 | Kiehne | 279—75 |
| 3,039,781 | 6/62 | Bilz | 279—75 |

ROBERT C. RIORDON, *Primary Examiner.*

RALPH H. BRAUNER, *Examiner.*